(12) United States Patent
Benear et al.

(10) Patent No.: US 6,556,311 B1
(45) Date of Patent: *Apr. 29, 2003

(54) LUMINANCE-BASED COLOR RESOLUTION ENHANCEMENT

(75) Inventors: Richard H. Benear, Boise, ID (US); James R. Nottingham, Boise, ID (US)

(73) Assignee: Hewlett-Packard Development Co., L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 935 days.

(21) Appl. No.: 08/864,944

(22) Filed: May 28, 1997

(51) Int. Cl.[7] .............................. G06F 13/00; G06F 3/12
(52) U.S. Cl. ........................ 358/1.9; 358/520; 358/522
(58) Field of Search ................................ 395/109, 108; 382/205, 269, 272; 358/428, 443, 448, 449, 520, 522

(56) References Cited

U.S. PATENT DOCUMENTS

| | | | |
|---|---|---|---|
| 5,253,335 A | 10/1993 | Mochizuki et al. | 395/122 |
| 5,299,308 A | 3/1994 | Suzuki et al. | 395/162 |
| 5,317,679 A | 5/1994 | Ueda et al. | 395/132 |
| 5,561,721 A | * 10/1996 | Mutz | 382/205 |
| 5,844,988 A | * 12/1998 | Ryan et al. | 380/11 |

FOREIGN PATENT DOCUMENTS

EP    0768792 A2    9/1996    ............ H04N/1/40

* cited by examiner

Primary Examiner—David Moore
Assistant Examiner—Douglas Tran
(74) Attorney, Agent, or Firm—Lane R. Simmons

(57) ABSTRACT

A method and apparatus enhance a color or grayscale raster image in a printer by identifying a working pixel in the raster image for anti-aliasing, and then modifying luminance data of the working pixel in a luminance chrominance color space such that an anti-aliasing effect is achieved relative to the raster image. The luminance component of the raster image data is converted to a binary format to identify the working pixel using RET template matching. The luminance data of the working pixel is modified by utilizing luminance data of adjacent pixels to produce a new luminance value which is then assigned to the working pixel. One of the adjacent pixels defines an edge of the object being anti-aliased in the raster image, and the other of the adjacent pixels defines an edge of a region in the raster image that is adjacent the object. In the event chroma data is associated with the object, the chroma data is combined with the modified luminance data and also assigned to the working pixel for accurate imaging thereof.

19 Claims, 3 Drawing Sheets

LUMINANCE-BASED COLOR RESOLUTION ENHANCEMENT

FIELD OF THE INVENTION

This invention relates in general to imaging systems and print resolution enhancement and, more particularly, to resolution enhancement for color printers.

BACKGROUND OF THE INVENTION

Electrophotographic processes for producing a permanent image on media are well known and commonly used. In general, a common process includes: (1) charging a photoreceptor such as a roller or continuous belt bearing a photoconductive material; (2) exposing the charged area to a light image to produce an electrostatic charge on the area in the shape of the image; (3) presenting developer particles (toner) to the photoreceptor surface bearing the image so that the particles are transferred to the surface in the shape of the image; (4) transferring the particles in the shape of the image from the photoreceptor to the media; (5) fusing or fixing the particles in the shape of the image to the media; and (6) cleaning or restoring the photoreceptor for the next printing cycle. Many image forming apparatus, such as laser printers, copy machines, and facsimile machines, utilize this well known electrophotographic printing process.

In laser printers, an image is typically rendered to form an image bitmap (or bit pattern) for subsequent transfer to the print engine for hardcopy output. The image bitmap is also referred to as a picture element ("pixel") raster image and is stored either as a binary image bitmap or as a multi-bit per pixel image bitmap. In the rendering process (i.e., forming the bitmap), graphic elements, such as continuous lines (line art) and text character outlines are converted to pixel patterns that approximate the source image shape. Continuous tone data, such as photographic data (both color and gray value images) are also converted to pixel patterns that approximate the source continuous tone image data. However, to effectively portray the original source image for continuous tone data, each pixel of the source image must be represented by multiple bits which define either a color or a gray level. For example, when a multi-bit configuration of 8 bits per pixel is employed, 256 gray levels can be represented by the digital pixel values. In color images, 24 bits are typically used, with 8 bits for each of the color components, i.e., Red, Green, Blue (RGB), etc. Hereafter, it is to be understood that when the term "gray" is used, it applies to both color and black/white images and, when applied to a color image, relates to the luminance of the color.

Once a raster page buffer array (image) bitmap is generated from a source image, whether the image is text, line art, vector graphics or continuous tone data, the desired output image is created by causing a laser to be modulated in accordance with the bit pattern stored in the image page buffer array bitmap. The modulated laser beam is scanned across a charged surface of a photosensitive drum in a succession of raster scan lines. Each scan line is divided into the pixel areas dictated by the resolution of the bitmap and the pitch of the laser scan. The modulated laser beam causes some pixel areas to be exposed to a light pulse and some not, thus causing a pattern of overlapping dots on each scan line. Where a pixel area (dot) is illuminated, the photosensitive drum is discharged, so that when it is subsequently toned, the toner adheres to the discharged areas and is repelled by the still charged areas. The toner that is adhered to the discharged areas is then transferred to paper and fixed in a known manner.

In general, the fidelity of the output image relative to the source data is directly related to the resolution of pixels (dots) in the output image. Arbitrary analog images cannot be exactly reproduced by a bitmap raster unless an infinite resolution is used. For example, as a result of the images's pixel configuration, image edges that are either not parallel to the raster scan direction or not perpendicular to it appear stepped. This is especially noted in text and line art.

Various techniques have been developed to improve the quality of the output image of a raster bitmap. These enhancement techniques include: edge smoothing, fine line broadening, anti-aliasing (to smooth jagged edges), and increasing the resolution of the laser printer. These enhancing techniques typically modify (modulate) the signals to the laser to produce smaller dots that are usually offset from the pixel center, or in other words, to produce multi-level dots. However, most of the enhancing techniques operate on the data after it has already been rendered into a raster bit map, and hence after the fine detail has already been lost. Thus, most enhancing techniques employ interpolation methods upon the bitmap data to "best" recreate the original image. Furthermore, most enhancing techniques attempt to increase the virtual resolution of the image beyond the actual resolution of the print engine.

Although the prior art has attempted in a variety of ways to overcome the stepped appearance of pixel image edges for text and line art, an example of one of the more widely known techniques is described in U.S. Pat. No. 4,847,641 to Tung, the disclosure of which is incorporated in full herein by reference. Tung discloses a character generator that produces a bitmap of image data and inputs that bitmap into a first-in first-out (FIFO) data buffer. A fixed subset of the buffer stored bits forms a sampling window through which a selected block of the bitmap image data may be viewed (for example, a 9×9 block of pixels with the edge pixels truncated). The sampling window contains a center bit cell which changes on each shift of the image bits through the FIFO buffer. As the serialized data is shifted, the sampling window views successive bit patterns formed by pixels located at the window's center bit cell and its surrounding neighbor bit cells. Each bit pattern formed by the center bit and its neighboring bits is compared in a matching network with prestored templates. If a match occurs, indicating that the center bit resides at an image edge and that the pixel it represents can be altered so as to improve the image's resolution, a modulation signal is generated that causes the laser beam to alter the center pixel configuration. In general, the center pixel is made smaller than a standard unmodified bitmap pixel and is possibly moved within the confines of the pixel cell. The pixel size alteration is carried out by modulating the laser contained in the "laser print engine" of the laser printer. The system taught by Tung is now generally referred to as Resolution Enhancement Technology (RET) and enables substantially improved image resolutions to be achieved for text and line art over actual print engine resolution capability. It is the goal of RET to reduce the undesirable visual effects caused by printing continuous curves or slanted lines with discrete dots.

A significant drawback of conventional resolution enhancement technology is that it is not suitable for color imaging. Specifically, RET is applicable only to binary image bitmaps. On the other hand, color imaging utilizes multi-bit per pixel data to create the desired color image and, as such, is not typically processed through conventional RET.

For color imaging, many multi-bit per pixel color space schemes are known in the art. For example, RGB (Red, Green and Blue), CMYK (Cyan, Magenta, Yellow and Black), YCC (Y, Cb, Cr), YIQ and YES each describe different color models and represent just a few conventional examples. These models are typically described with a coordinate system, but each model may represent the color data differently. For example, in the RGB system, the lightness or darkness (i.e., luminance, or measure of how bright the color appears) of a pixel is contained in a combination of all three of the signals R, G, and B. However, in other systems (including YCC, YIQ and YES), the "Y" component describes luminance and the other components (i.e., CC, IQ and ES) each describe chroma (i.e., hue and saturation). In all of these models, each component is generally represented with 8 bits of data. For a more complete guide to color spaces, see *Reproduction of Colour*, by D. R. W. G. Hunt, 5th Edition, Fountain Press England, and *Fundamentals of Digital Image Processing*, by Anil K. Jain, Prentice Hall, each of which is incorporated in full herein by reference.

Given the complexities associated with multi-bit per pixel color imaging and manipulations (i.e., the complexities associated with the sheer amount of data being processed, storage capacities for that data, processing burdens, etc.), most prior art anti-aliasing solutions have been directed toward monochrome images (as discussed with RET and Tung). Other solutions require knowledge of the original placement of pixels and the error associated with constraining those pixels to a fixed grid (see Mochizuki et al., U.S. Pat. No. 5,253,335). Still others are directed to type fonts generated by font outlines and require the knowledge of the inside and outside of the font (see Ueda et al., U.S. Pat. No. 5,317,679). The disadvantage of these approaches is that they all require some knowledge about the object being rendered. Often, however, a printer does not have control over the image that it receives, but only receives the image as a raster file. Other solutions have divided an edge pixel up into subpixels in order to soften the edge of an object (see Suzuki et al., U.S. Pat. No. 5,299,308). This approach allows a printer to more carefully sculpt a printed line by shaving off the jagged edges associated with dot matrix printing. However, implied in this solution is that the printer has the ability to render dots at a pitch finer than the source data. This might imply for example that a printer must be capable of rasterizing 1200 dot per inch (dpi) images in order to anti-alias a 600 dpi source image.

Accordingly, an object of the present invention is to provide anti-aliasing resolution enhancement for color and grayscale raster image data.

SUMMARY OF THE INVENTION

According to principles of the present invention in a preferred embodiment, a method and apparatus enhance a color or grayscale raster image in a printer by identifying a working pixel in the raster image for anti-aliasing, and then modifying luminance data of the working pixel in a luminance chrominance color space such that an anti-aliasing effect is achieved relative to the raster image. The luminance component of the raster image data is converted to a binary format to identify the working pixel using RET template matching. The modifying of the luminance data is applicable to color as well as grayscale image data.

According to further principles, luminance data of the working pixel is modified by utilizing luminance data of adjacent pixels to produce a new luminance value which is then assigned to the working pixel. One of the adjacent pixels defines an edge of an object in the raster image, and the other of the adjacent pixels defines an edge of a region in the raster image that is adjacent the object. In the event chroma data is associated with the object, the chroma data is combined with the modified luminance data and also assigned to the working pixel.

Other objects, advantages, and capabilities of the present invention will become more apparent as the description proceeds.

DETAILED DESCRIPTION OF THE INVENTION

Figure 1:
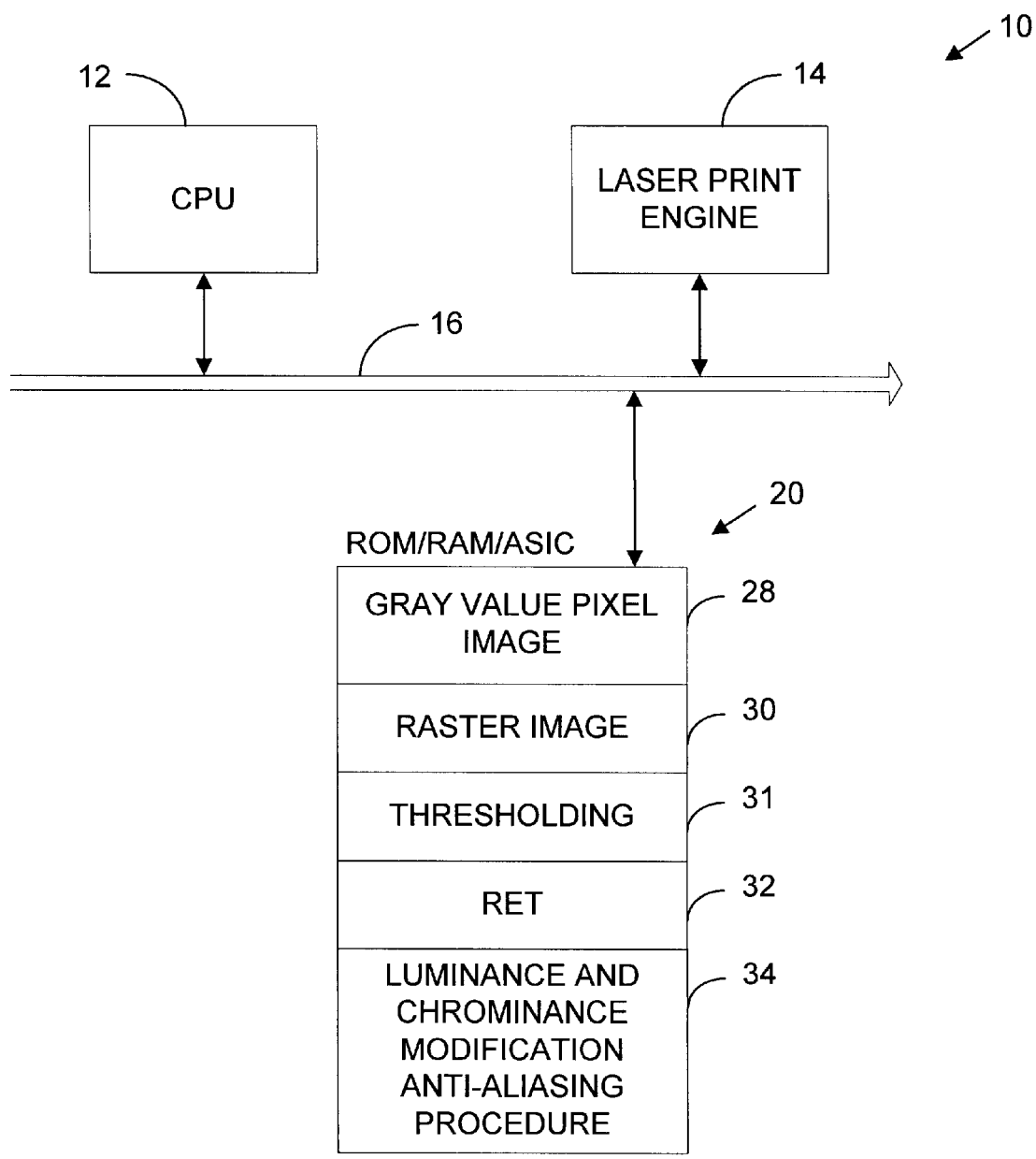
FIG. 1 is a block diagram of a laser printer incorporating the invention hereof.

FIG. 1 is a block diagram of laser printer 10 that incorporates the present invention hereof for modifying luminance data of a multi-bit per pixel source image for resolution enhancement thereof. More specifically, the present invention modifies the luminance component of source image pixel data in a luminance chrominance color space to create an anti-aliased pixel effect.

It is to be understood that while a laser printer will be hereafter described, the invention is equally applicable to any device which renders/rasterizes multi-bit per pixel data. For example, such devices include laser printers, copiers, facsimile devices, plotters, inkjet based devices, display monitors, etc.

Laser printer 10 comprises a central processing unit (CPU) 12 and a laser print engine 14, interconnected via a bus 16. A read only memory (ROM) and/or random access memory (RAM) and/or application-specific integrated circuit (ASIC) 20 is/are also interconnected to bus 16. For simplicity of illustration and discussion purposes, ROM/RAM/ASIC 20 is shown as a single block unit although as is well known in the art they are generally separate units for providing specific functionalities. It is also to be understood that the rendering and anti-aliasing procedures and data discussed herein for printer 10 may be maintained and utilized as control firmware in any conventional ROM, and/or implemented in an ASIC for high-speed hardware functionality, and/or implemented in connection with RAM for storage and buffering purposes.

ROM/RAM/ASIC 20 includes procedures and data necessary to enable CPU 12 to carry out the functions of printer 10 and of the invention. More specifically, ROM/RAM/ASIC 20 includes gray value pixel image 28 which is to be rendered into a raster image 30 that is suitable for processing by laser print engine 14 to a final hardcopy output. Gray value pixel image 28 is received from a host processor (not shown). Gray value pixel image 28 is representative of a color image or, alternatively, a grayscale image. Raster image 30 may be buffered in RAM or fed directly from an ASIC to print engine 14. Thresholding procedure 31 converts the multi-bit per pixel luminance component data of raster image 30 into a binary bitmap. Resolution enhancement technology (RET) procedure 32 provides a means for identifying a working pixel to be anti-aliased according to the present invention, and further provides edge smoothing for text and line art stored within raster image 30. Luminance and chrominance procedure 34 provides luminance and chrominance data modification to the selected pixel being anti-aliased under the present invention and as discussed more fully herein.

Gray value pixel image 28 is of the known type wherein each pixel is represented by a multi-bit gray value or color. If gray value pixel image 28 is a color image, it will comprise (generally) four color planes with three of the color planes representing cyan, magenta and yellow color values (or red, green and blue color planes). Moreover, each color value in each plane may be represented by a predetermined number of bits—for example, typically, from 1 to 8 bits. A fourth plane, representing black, may similarly be comprised of single or multiple bit values at each pixel location where a black or grayscale image value is to appear on the ultimate output. Thus there may be a total of 4 to 32 bits per pixel, typically, in gray value pixel image 28 if color is embodied. On the other hand, if gray value pixel image 28 is a non-color image, each pixel may, for example, be represented simply by 8 bits to depict 256 levels of gray as well known in the art. Other bit depths and color planes, such as in hi-fi printing, are equally applicable in the present invention, as will be obvious to those of ordinary skill in the art.

Laser print engine 14 is capable of rendering raster image 30 at a given dpi resolution, such as at 300, 600 or 1200 dpi, depending on design criteria. For purposes of this discussion, print engine 14 is a 1200 dpi engine. Under principles of the present invention, raster image 30 is processed through luminance and chrominance procedure 34 for enhanced rasterizing on print engine 14. Specifically, each pixel in raster image 30 that is identified to be anti-aliased has its luminance data and possibly its chroma data modified by luminance and chrominance procedure 34.

Figure 2:
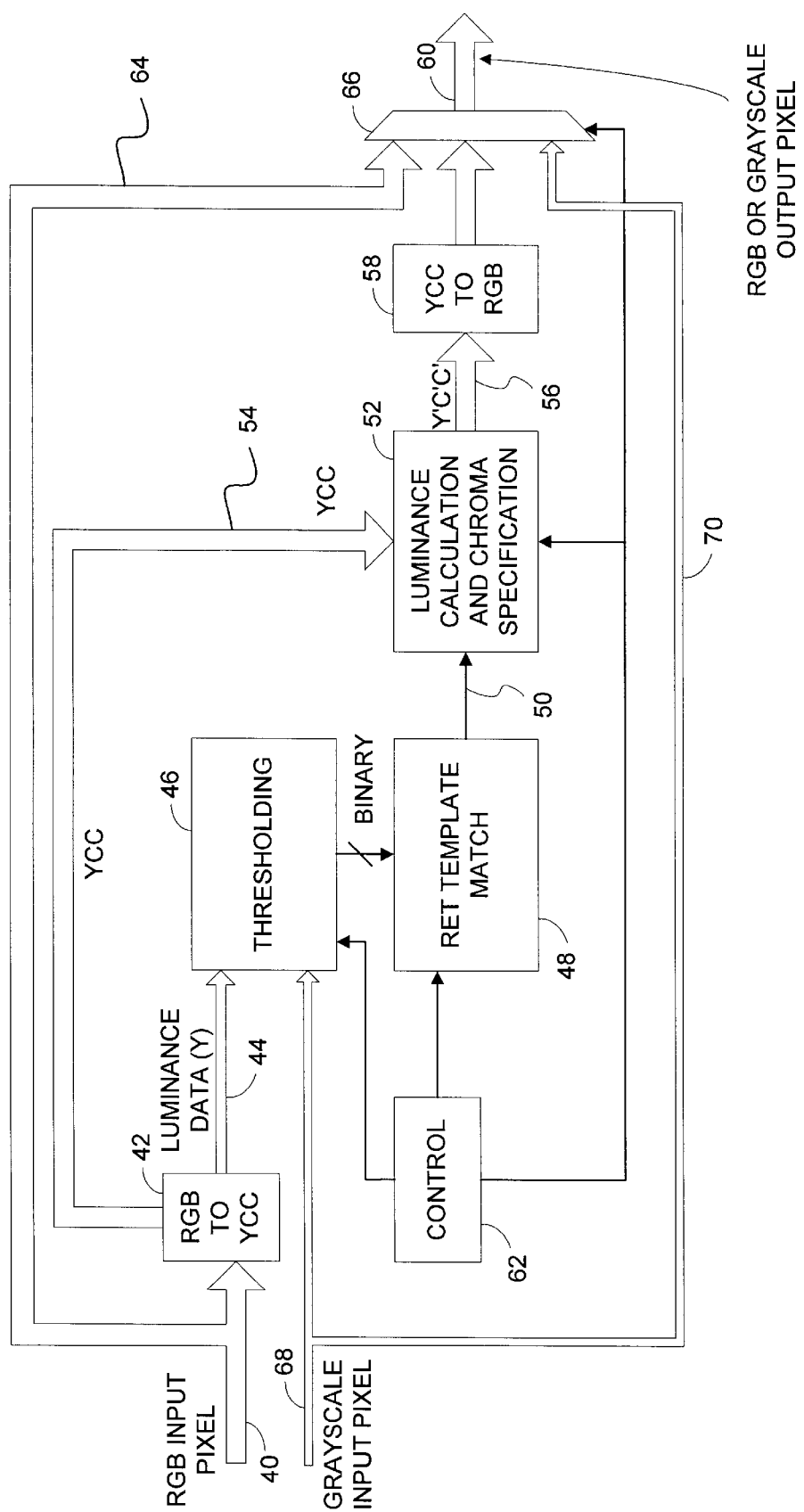
FIG. 2 is a block diagram depicting the data processes associated with the present invention.

FIG. 2 is a block diagram depicting the apparatus and processing associated with the present invention luminance and chrominance procedure 34 (FIG. 1) as it correlates to threshold and RET procedures 31, 32 (FIG. 1) and other aspects of laser printer 10. The drawing depicts a color system employing an RGB color model in connection with the present invention luminance-based resolution enhancement. However, other models are similarly applicable. In this context, RGB input pixel 40 is first converted to a luminance chrominance color model 42. In this example, the luminance chrominance color model is YCC, however, again, any luminance chrominance color model is equally usable under similar principles. Once the RGB pixel is converted to the YCC model, the luminance component (Y) data 44 is passed on to a thresholding procedure/operation 46. Thresholding procedure 46 is any known operation in the art that is capable of converting the multi-bit per pixel luminance component data (Y) into a binary data image while keeping the integrity of the image as true as possible.

Thresholding procedure 46 is performed in order to enable a conventional RET template match 48 of the source image using binary data (in this case, using only the Y component of the source image and converting that to a binary format for RET processing). RET template match 48 is any procedure known in the art, such as that described in Tung, whereby pixels are identified, usually on edges of objects, that need to be anti-aliased for improving the overall appearance of the raster image (or object). This identification generally occurs by recognizing (through a template match) a configuration of a plurality of pixel data that is adjacent to the working pixel. Upon identifying a template match for any given working pixel being processed, a scale factor is produced (based on the template used) and transmitted 50 to the luminance calculation and chroma specification procedure 52. The scale factor is assigned to each RET template or templates upon creation and storing of the template(s), and may be modified by psychometric evaluations and/or intelligent training programs.

Luminance calculation and chroma specification procedure 52 takes the original YCC data 54, in connection with scale factor 50 from RET template match 48, and produces new Y'C'C' pixel data 56. The Y' luminance component identifies the new luminance value for the working pixel for providing an anti-aliasing effect with respect to the source image or object with which the working pixel is associated. The C'C' components may or may not be the same as the original CC components, depending upon chroma evaluations discussed further herein. Once the Y'C'C' pixel is produced, it is converted back into the originating RGB color model 58 (in this example) and transmitted as an RGB output pixel 60 for subsequent processing by print engine 14.

Luminance calculation and chroma specification procedure 52 calculates the new Y' luminance value by utilizing the luminance data of pixels that are adjacent to the working pixel. Specifically, the luminance value of an adjacent pixel that defines the edge of the object being anti-aliased is considered, and the luminance value of an adjacent pixel that defines an edge of a region in the raster image that is adjacent the object is also considered. Once these values are determined, various mathematical calculations can be used for best anti-aliasing the working pixel. However, a preferred calculation is simply to average the luminance values of the adjacent pixels, and then divide by a factor. In a preferred embodiment, the factor is the scale factor output 50 of RET template match 48. As such, a scale factor of 1 produces for the working pixel a Y' having an average luminance of the identified adjacent pixels for providing an "averaged luminance" anti-aliasing effect. On the other hand, an increasingly larger scale factor produces an increasingly smaller Y' luminance value for a more subtle anti-aliasing effect. Obviously, the scale factors are programmably adjustable as provided by the templates used in RET template match 48.

Turning now to the chroma components C'C' 56 as produced by luminance calculation and chroma specification procedure 52, an appropriate color (hue and saturation) must be assigned to the working pixel along with the new luminance value Y'. If the working pixel defines part of the object prior to being anti-aliased, then 'C'C' equals CC (i.e., no modification). In essence, the chroma is not modified because the working pixel is already part of the edge of the object being anti-aliased and therefore remains the same. On the other hand, if the working pixel does not define part of the object prior to being anti-aliased, then the new chroma data C'C' is designated to be the chroma data of a pixel that defines part of the object and that is adjacent the working pixel. This ensures that the working pixel being anti-aliased always remains the same color as the object being anti-aliased in connection with the working pixel. Upon producing C'C', these components are combined with Y' and assigned to the working pixel for subsequent conversion 58 and processing as output pixel 60.

Further to FIG. 2, control procedure 62 enables timing and transfer of data among the varying procedures/operations described, as well known in the art. Data path 64 depicts an option around the anti-aliasing procedures described. Thus, depending upon the settings of multiplexor (mux) 66 as fashioned by control 62, pixel data is processed either through the anti-aliasing procedures 46, 48, 52 and out through mux 66 to become the resultant output pixel, or, optionally, the pixel data may bypass these procedures altogether 64.

Thus far, color data has been described in reference to the present invention anti-aliasing method and apparatus. However, luminance is a term that is equally applicable to grayscale data as well as color data. In the context of grayscale data, luminance is also represented by multiple bits (usually 8) and denotes a variation in the lightness or darkness of the pixel, only without color. As such, an advantage of the present invention is that it can anti-alias grayscale data just as well as color data. Specifically, grayscale pixel data 68 is processed through luminance anti-aliasing procedures 46, 48 and 52 just the same as was the Y luminance component in the luminance chrominance model. Alternatively, the grayscale data 68 may bypass the anti-aliasing procedures via data path 70. Accordingly, whether color or grayscale pixel data is received, the luminance data is modified where appropriate according to the present invention for providing an anti-aliasing effect.

Figure 3:
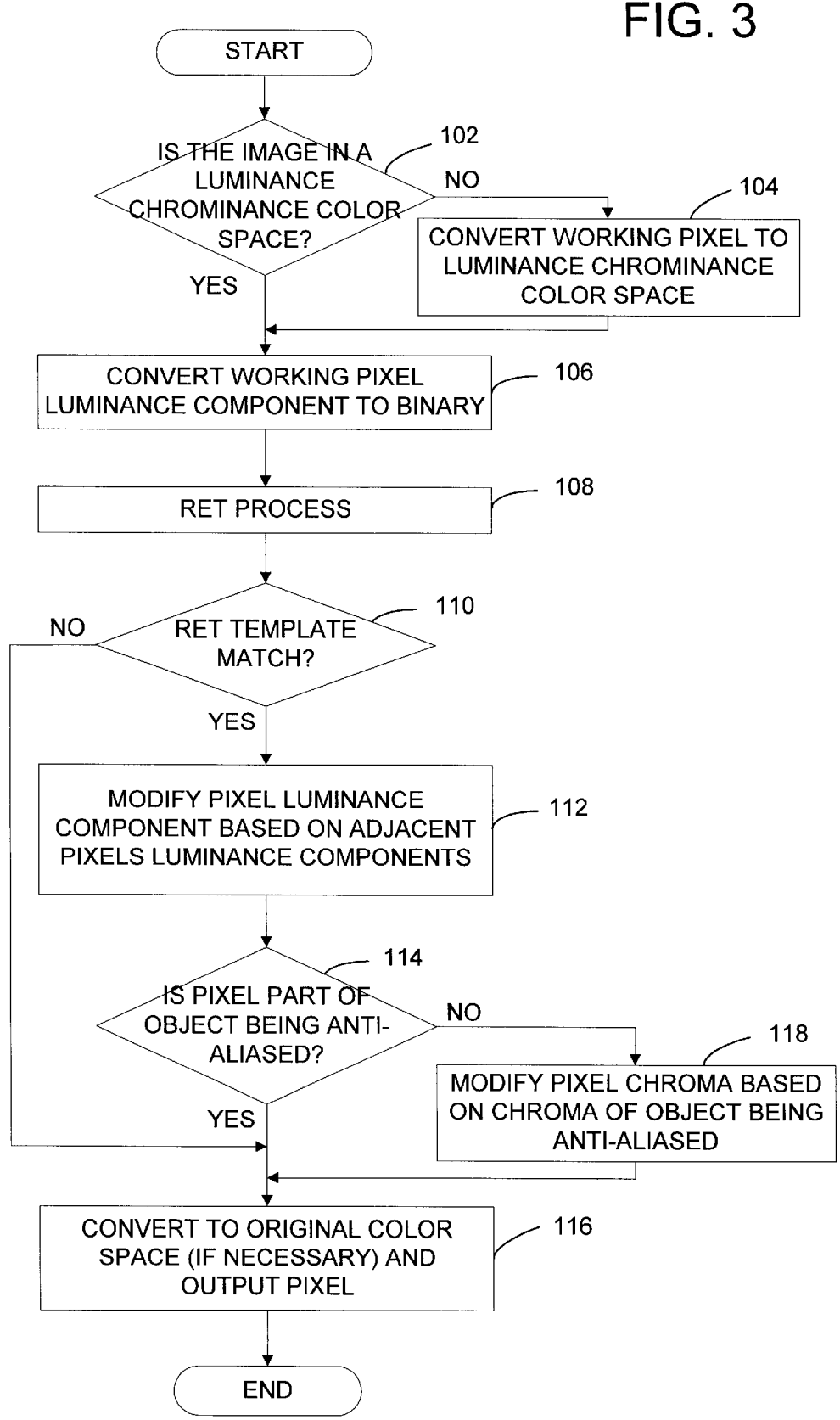
FIG. 3 is a flow chart depicting a preferred method of the present invention.

Referring now to FIG. 3, a flow chart depicts a preferred method of the present invention. First, if the image being processed is not in a luminance chrominance color space 102 (for example, if the source image is in an RGB color space), then the working pixel (i.e., the pixel currently being processed) is converted 104 to a luminance chrominance color space, such as YCC. Subsequently, the working pixel's luminance component is threshold converted 106 to a binary format so that it can be RET processed 108 using RET template matching or other similar anti-aliasing detection mechanism. If no RET template match occurs 110, then the anti-aliasing steps are bypassed and the pixel is simply forwarded on out as the output pixel 116. If the input pixel was not originally in a luminance chrominance color space, then the pixel is converted back to the original color space 116 prior to being output.

If there is a RET template match 110 for the working pixel, then its luminance component is modified 112 based on the luminance components of adjacent pixels (as more fully discussed in reference to FIG. 2). Then, if the working pixel is detected to be a part of the object being anti-aliased 114, then the working pixel is simply converted back to its original color space as necessary and is output 116 with its modified luminance component and original chroma components. On the other hand, if the working pixel is not part of the object being anti-aliased 114, then the pixel's chroma values are modified 118 based on the chroma of the object being anti-aliased (as more fully discussed in reference to FIG. 2). Subsequently, the modified pixel is converted back to its original color space (if necessary) and then is output with its modified luminance component and modified chroma components 116.

Clearly, the present invention provides an efficient apparatus and method for anti-aliasing color and/or grayscale and/or binary pixel data. Moreover, the degree of anti-aliasing application is easily adjustable (i.e., programmable using the scale factor). Furthermore, no knowledge of any particular object generation is needed; the apparatus and method are easily implemented in hardware for fast processing; and no color artifacts occur that are common, conventionally, to other anti-aliasing schemes.

Finally, what has been described above are preferred embodiments of an apparatus and method for anti-aliasing multi-bit per pixel color and/or grayscale pixel data by modifying its luminance component. While the present invention has been described by reference to specific embodiments, it will be apparent that other alternative embodiments and methods of implementation or modification may be employed without departing from the true spirit and scope of the invention.

What is claimed is:

1. A method of enhancing a multi-bit per pixel raster image, comprising:
   (a) converting luminance data of the multi-bit per pixel raster image to binary data per pixel, wherein the luminance data is a Y only component in a luminance chrominance color space;
   (b) identifying a working pixel from the binary data; and,
   (c) modifying the Y only component luminance data of the working pixel such that an anti-aliasing effect is achieved relative to the raster image.

2. The method of claim 1 wherein the working pixel is identified in the raster image as a key pixel for improving overall apparent resolution of the raster image.

3. The method of claim 1 wherein the working pixel is identified in the raster image by recognizing a configuration of a plurality of pixel data adjacent the working pixel.

4. The method of claim 1 wherein the working pixel is identified using a resolution enhancement technology (RET) template match.

5. The method of claim 1 wherein modifying luminance data of the working pixel includes utilizing luminance data of adjacent pixels to produce a new luminance value and then assigning the new luminance value to the working pixel.

6. The method of claim 5 wherein, optionally, (i) the luminance data of the adjacent pixels is averaged to produce the new luminance value, or (ii) the luminance data of the adjacent pixels is averaged and then divided by a factor to produce the new luminance value.

7. The method of claim 5 wherein the raster image defines at least one object therein to be anti-aliased, and wherein one of the adjacent pixels defines an edge of the object, and another of the adjacent pixels defines an edge of a region in the raster image that is adjacent the object.

8. The method of claim 1 wherein the raster image defines at least one object therein to be anti-aliased, and further including, in the event the object has chroma data, combining certain of the chroma data with the modified luminance data and assigning the combined data to the working pixel.

9. The method of claim 8 wherein:
   (a) if the working pixel defines part of the object prior to being anti-aliased, then the certain of the chroma data is chroma data of-the working pixel; and,
   (b) if the working pixel does not define part of the object prior to being anti-aliased, then the certain of the chroma data is chroma data of a pixel that defines part of the object and that is adjacent the working pixel.

10. A computer readable medium having computer executable instructions for performing steps including:
   (a) converting luminance data of a multi-bit per pixel raster image to binary data per pixel, wherein the luminance data is a Y only component in a luminance chrominance color space;
   (b) identifying a working pixel from the binary data; and,
   (c) modifying the Y only component luminance data of the working pixel such that an anti-aliasing effect is achieved relative to the raster image.

11. A method of anti-aliasing an edge of an object in a raster image, the raster image being represented by multi-bit per pixel data, the method comprising the steps of:
   (a) thresholding a pure luminance only component of the multi-bit per pixel data to obtain a copy representation of the raster image in a binary data format;
   (b) identifying a working pixel in the binary data for anti-aliasing with respect to the edge of the object;

(c) modifying the pure luminance only component of the working pixel, the sure luminance only component being defined in the multi-bit per pixel data; and, (d) assigning the modified pure luminance only component and assigning chroma data, if any, of the object to the multi-bit per pixel data of the working pixel thereby producing an anti-aliasing effect for the working pixel relative to the object.

12. A resolution enhancement apparatus for enhancing resolution of a multi-bit per pixel raster image, comprising:

(a) conversion apparatus for converting a pure luminance only component of the multi-bit per pixel raster image to binary data per pixel;

(b) pixel identification apparatus for identifying a working pixel in the binary data for anti-aliasing; and, (c) luminance modification apparatus for modifying the pure luminance only component of the working pixel whereby an anti-aliasing effect is achieved for the working pixel relative to the raster image.

13. The apparatus of claim 12 wherein the pixel identification apparatus identifies the working pixel in the raster image by recognizing a configuration of a plurality of pixel data adjacent the working pixel.

14. The apparatus of claim 12 wherein the pixel identification apparatus identifies the working pixel using a template match.

15. The apparatus of claim 12 wherein:

(a) if the raster image is a color image, then the pure luminance only component is indicative of a brightness of color associated with the working pixel, and;

(b) if the raster image is a grayscale image, then the pure luminance only component is indicative of a grayscale value associated with the working pixel.

16. The apparatus of claim 12 wherein the luminance modification apparatus provides for utilizing luminance data of pixels adjacent to the working pixel to produce a new luminance value and further provides for assigning the new luminance value to the working pixel.

17. The apparatus of claim 16 wherein one of the adjacent pixels defines an edge of an object in the raster image, and another of the adjacent pixels defines an edge of a region in the raster image that is adjacent the object.

18. The apparatus of claim 12 wherein the raster image defines at least one object therein to be anti-aliased, and further including chroma modification apparatus for combining certain chroma data of the object, if any, with the modified luminance data and for assigning the combined data to the working pixel.

19. The apparatus of claim 18 wherein:

(a) if the working pixel defines part of the object prior to being anti-aliased, then the certain chroma data of the object is chroma data of the working pixel; and, (b) if the working pixel does not define part of the object prior to being anti-aliased, then the certain chroma data of the object is chroma data of a pixel that defines part of the object and that is adjacent the working pixel.

* * * * *

UNITED STATES PATENT AND TRADEMARK OFFICE
CERTIFICATE OF CORRECTION

PATENT NO. : 6,556,311 B1  
DATED : April 29, 2003  
INVENTOR(S) : Richard H. Benear et al.

It is certified that error appears in the above-identified patent and that said Letters Patent is hereby corrected as shown below:

Column 8,
Line 44, delete "of-the" and insert therefor -- of the --

Signed and Sealed this

Fourth Day of January, 2005

JON W. DUDAS
*Director of the United States Patent and Trademark Office*